United States Patent
Yuan

(10) Patent No.: US 10,701,073 B2
(45) Date of Patent: Jun. 30, 2020

(54) TERMINAL AUTHENTICATION METHOD AND DEVICE

(71) Applicant: Huawei Technologies Co., Ltd., Shenzhen (CN)

(72) Inventor: Xianhu Yuan, Dongguan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/392,157

(22) Filed: Apr. 23, 2019

(65) Prior Publication Data
US 2019/0253418 A1 Aug. 15, 2019

Related U.S. Application Data

(63) Continuation of application No. PCT/CN2017/088231, filed on Jun. 14, 2017.

(30) Foreign Application Priority Data

Oct. 25, 2016 (CN) .......................... 2016 1 0940602

(51) Int. Cl.
*H04L 29/06* (2006.01)
*H04L 29/08* (2006.01)

(52) U.S. Cl.
CPC .......... *H04L 63/0876* (2013.01); *H04L 29/06* (2013.01); *H04L 29/08* (2013.01); *H04L 63/166* (2013.01); *H04L 67/02* (2013.01); *H04L 69/162* (2013.01)

(58) Field of Classification Search
CPC ..... H04L 63/0876; H04L 29/06; H04L 29/08; H04L 69/162; H04L 67/02; H04L 63/166; H04L 47/10; H04L 63/08
See application file for complete search history.

(56) References Cited

U.S. PATENT DOCUMENTS

| | | | | |
|---|---|---|---|---|
| 6,584,505 B1 * | 6/2003 | Howard | .................. | G06F 21/31 709/225 |
| 6,678,731 B1 * | 1/2004 | Howard | .................. | G06F 21/31 709/225 |
| 7,251,827 B1 * | 7/2007 | Guo | ........................ | G06F 21/31 726/10 |
| 9,148,408 B1 * | 9/2015 | Glazemakers | ........ | H04L 63/029 |

(Continued)

FOREIGN PATENT DOCUMENTS

| CN | 103220345 A | 7/2013 |
|---|---|---|
| CN | 105871853 A | 8/2016 |
| WO | WO-2017177691 A1 * | 10/2017 ............. H04L 29/06 |

OTHER PUBLICATIONS

Machine translation of WO 2017/177691-A1 (Year: 2017).*

(Continued)

*Primary Examiner* — Joseph P Hirl
*Assistant Examiner* — Thomas A Gyorfi
(74) *Attorney, Agent, or Firm* — Conley Rose, P.C.

(57) ABSTRACT

A terminal authentication method comprises sending, by a terminal by using a first application, an HTTP traffic request; receiving an HTTP traffic response that includes a JavaScript tag and that is sent by an access device; obtaining an address of a portal server from the JavaScript tag by using the first application; and performing the terminal's authorization and authentication based on the address of the portal server.

26 Claims, 9 Drawing Sheets

(56) References Cited

U.S. PATENT DOCUMENTS

| | | | |
|---|---|---|---|
| 2004/0068665 A1 | 4/2004 | Fox et al. | |
| 2008/0098301 A1* | 4/2008 | Black | H04L 67/1008 715/246 |
| 2008/0320075 A1* | 12/2008 | Livshits | H04L 63/145 709/203 |
| 2009/0172792 A1 | 7/2009 | Backhouse | |
| 2010/0242092 A1 | 9/2010 | Harris et al. | |
| 2010/0274859 A1* | 10/2010 | Bucuk | H04L 63/08 709/206 |
| 2013/0080635 A1* | 3/2013 | Ho | H04L 67/32 709/225 |
| 2015/0281225 A1* | 10/2015 | Schoen | H04L 63/06 726/9 |
| 2016/0044083 A1* | 2/2016 | Galloway | H04L 67/02 709/217 |
| 2016/0057232 A1 | 2/2016 | Liang et al. | |
| 2016/0119304 A1* | 4/2016 | Lelcuk | H04L 63/08 726/3 |
| 2016/0191351 A1* | 6/2016 | Smith | H04L 43/062 709/219 |

OTHER PUBLICATIONS

A. Freier et al. "RFC 6101: The Secure Scokets Layer (SSL) Protocol Version 3.0" Published Aug. 2011 (67 pages) (Year: 2011).*

T. Dierks et al. "RFC 2246: The TLS Protocol Version 1.0" Published Jan. 1999 (80 pages) (Year: 1999).*

Jon Postel. "RFC 793: Transmission Control Protocol" Published Sep. 1981 (pp. 1-85) (Year: 1981).*

Machine Translation and Abstract of Chinese Publication No. CN105871853, Aug. 17, 2016, 14 pages.

Foreign Communication From a Counterpart Application, PCT Application No. PCT/CN2017/088231, English Translation of International Search Report dated Aug. 2, 2017, 2 pages.

Foreign Communication From a Counterpart Application, PCT Application No. PCT/CN2017/088231, English Translation of Written Opinion dated Aug. 2, 2017, 4 pages.

Foreign Communication From a Counterpart Application, European Application No. 17865053.7, Extended European Search Report dated Jul. 11, 2019, 8 pages.

* cited by examiner

TERMINAL AUTHENTICATION METHOD AND DEVICE

CROSS-REFERENCE TO RELATED APPLICATIONS

This application is a continuation application of Int'l Patent App. No. PCT/CN2017/088231 filed on Jun. 14, 2017, which claims priority to Chinese Patent App. No. 201610940602.4 filed on Oct. 25, 2016, which are incorporated by reference.

TECHNICAL FIELD

The present disclosure relates to the field of communications technologies, and in particular, to a terminal authentication method and a device.

BACKGROUND

With development of network technologies, a problem of network security has become more prominent. Portal authentication is a method that can effectively protect network security. Portal authentication means that a terminal needs to be authorized and authenticated by a portal server to access network data.

Specifically, a portal authentication process may be as follows: When an access device receives a Hypertext Transfer Protocol (HTTP) traffic request initiated by an unauthorized terminal for the first time, the access device returns, to the terminal, an HTTP response carrying a Uniform Resource Locator (URL) address of a portal server. The terminal initiates an HTTP authentication page request to the portal server based on the URL address, and the portal server may return a response including a to-be-loaded HTTP authentication page to the terminal after completing a Transmission Control Protocol (TCP) handshake and a Secure Sockets Layer (SSL) handshake with the terminal. The terminal loads and displays the HTTP authentication page based on the response, receives authentication information input by a user on the HTTP authentication page, and sends the authentication information to the portal server for authorization and authentication.

The HTTP traffic request may be a valid traffic request initiated by the user when the user triggers a terminal browser, or may be an invalid traffic request automatically initiated by another application program in the terminal other than the browser. The access device cannot identify the valid traffic request and the invalid traffic request. Therefore, even if the terminal initiates an invalid traffic request to the access device, the terminal may still obtain the URL address of the portal server, and perform the operations of "initiating the HTTP authentication page request to the portal server and completing the TCP handshake and the SSL handshake".

However, there is a problem that, for the invalid traffic request, the authorization and authentication cannot be completed because the terminal cannot load or display the HTTP authentication page by using the application program. In other words, the authorization and authentication operations performed after the terminal obtains the URL address of the portal server are invalid operations without results. These invalid operations without results undoubtedly occupy network resources and increase portal server load.

SUMMARY

This application provides a terminal authentication method and a device, which can reduce network resource occupation due to invalid operations corresponding to invalid traffic requests during terminal authentication, and reduce portal server load.

According to a first aspect, a terminal authentication method is provided. The terminal authentication method includes: sending, by a terminal, an HTTP traffic request to an access device, where the HTTP traffic request is a traffic request initiated by using a first application in the terminal; receiving, by the terminal, an HTTP traffic response sent by the access device, where the HTTP traffic response is sent by the access device after the access device determines that the terminal is an unauthorized terminal, and the HTTP traffic response includes a JavaScript tag; and if the terminal obtains an address of a portal server based on the JavaScript tag by using the first application, performing, by the terminal, authorization and authentication on the terminal based on the address of the portal server.

Some application programs (such as a browser) in the terminal can parse the JavaScript tag while some application programs cannot parse the JavaScript tag. Therefore, the terminal may obtain the address of the portal server based on the JavaScript tag only when the first application of the terminal can parse the JavaScript tag. When the first application of the terminal cannot parse the JavaScript tag, the terminal cannot obtain the address of the portal server based on the JavaScript tag. It can be learned that with this solution, even if the terminal proactively initiates the HTTP traffic request to the access device by using the first application and receives the HTTP traffic response including the JavaScript tag, the terminal cannot perform an invalid operation without a result, such as "initiating an HTTP authentication page request to the portal server and completing a TCP handshake and an SSL handshake", if the terminal cannot obtain, based on the JavaScript tag by using the first application, the address of the portal server used for the terminal's authorization and authentication. This can avoid network resource occupation due to the invalid operation without a result and reduce portal server load.

In a possible implementation of the first aspect, the JavaScript tag may include an address of a management server. Correspondingly, the method in which "the terminal obtains an address of a portal server based on the JavaScript tag by using the first application" may include: obtaining, by the terminal, the address of the management server from the JavaScript tag by using the first application, and executing an Asynchronous JavaScript and Extensible Markup Language (Ajax) script based on the address of the management server by using the first application, to obtain, from the management server, an address of a least loaded portal server in portal servers managed by the management server.

After the terminal obtains, by using the first application, the address of the management server that is included in the JavaScript tag, the method for obtaining the address of the portal server from the management server may include: executing, by the terminal, the Ajax script by using the first application, and sending an authentication address request, where the authentication address request is used to instruct the management server to obtain the address of the least loaded portal server in the portal servers managed by the management server; and receiving, by the terminal, an authentication address response sent by the management server, where the authentication address response includes the address of the least loaded portal server.

The management server may manage at least two portal servers, that is, at least two portal servers may provide an authentication service for the terminal, and load of the at least two portal servers may be different. For example, some portal servers have relatively high load while some portal servers have relatively low load. Therefore, load balancing between the portal servers managed by the management server can be achieved by performing the "authorization and authentication on the terminal based on the address of the least loaded portal server".

In a possible implementation of the first aspect, the performing, by the terminal, authorization and authentication on the terminal based on the address of the portal server includes: executing, by the terminal, a JavaScript script by using the first application, and redirecting to a terminal authentication page of the portal server based on the address of the portal server, to perform authorization and authentication on the terminal.

After the terminal obtains the address of the portal server, a specific process of "executing, by the terminal, a JavaScript script by using the first application, and redirecting to a terminal authentication page of the portal server based on the address of the portal server" may include: initiating, by the terminal, an HTTP authentication page request to the portal server by using the first application; executing the JavaScript script to complete a TCP handshake and an SSL handshake with the portal server; and after an HTTP authentication page response is received, parsing a URL of an HTTP authentication page that is included in the HTTP authentication page response, loading and displaying the HTTP authentication page based on the URL of the HTTP authentication page, receiving authentication information input by a user on the HTTP authentication page, and then sending the authentication information to the portal server, to perform authorization and authentication on the terminal. It should be noted that the process of "executing a JavaScript script and redirecting to a terminal authentication page of the portal server based on the address of the portal server" is performed in a background of the terminal by using the first application by the terminal. An interface switch is performed on a displayed page of the first application, so that the HTTP authentication page is displayed to the user and the user-input authentication information is received, to complete authorization and authentication.

It can be figured out that in the process of "executing a JavaScript script and redirecting to a terminal authentication page of the portal server based on the address of the portal server", an entire web page does not need to be reloaded; instead, a part of the page available for the user to input authentication information is updated. In other words, only a part of the page instead of the entire page can be loaded by executing the JavaScript script. This can reduce an amount of information requested from the portal server, thereby further reducing portal server load.

In a possible implementation of the first aspect, even if the first application in the terminal can parse the JavaScript tag to obtain the address of the management server, for example, a browser can parse the JavaScript tag to obtain the address of the management server, the browser does not necessarily support Ajax, that is, some browsers may support Ajax while some browsers may not support Ajax. Based on this situation, in the terminal authentication method protected by this application, the JavaScript tag may include not only the address of the management server but also an address of a default portal server. Correspondingly, the terminal authentication method may further include: if the first application does not support Ajax, performing the terminal's authorization and authentication based on the address of the default portal server by using the first application.

For example, the first application is a browser. Not all browsers support Ajax due to factors such as a browser version and permission. When the first application (such as a browser) does not support Ajax, even if the terminal obtains the address of the management server by using the first application, the terminal cannot execute an Ajax script to obtain the address of the portal server from the management server, and therefore, the "executing a JavaScript script and redirecting to a terminal authentication page of the portal server based on the address of the portal server, to perform the terminal's authorization and authentication" cannot be performed. In this case, although the terminal cannot execute the Ajax script by using the first application, the terminal can execute the JavaScript script. Therefore, the terminal can execute the JavaScript script by using the first application and redirect to the terminal authentication page of the default portal server based on the address of the default portal server, to perform the terminal's authorization and authentication. In this way, even if the first application does not support Ajax, the terminal can complete the terminal's authorization and authentication after the terminal initiates the HTTP traffic request by using the first application.

In a possible implementation of the first aspect, that the HTTP traffic response includes a JavaScript tag may be: the HTTP traffic response includes Hypertext Markup Language (HTML) information, and the HTML information is embedded with the JavaScript tag. The HTML information may carry related information about a to-be-loaded page.

In a possible implementation of the first aspect, the JavaScript tag includes a list of portal servers, where the list of portal servers includes an address of at least one portal server. The method for obtaining, by the terminal, an address of a portal server based on the JavaScript tag by using the first application may include: obtaining, by the terminal from the JavaScript tag by using the first application, an address of any portal server included in the list of portal servers.

In a possible implementation of the first aspect, load of the at least one portal server may be different. For example, among the at least one portal server, some portal servers have relatively high load, and some portal servers have relatively low load. It can be figured out that after obtaining the list of portal servers included in the JavaScript tag, the terminal may query for load of each of the at least one portal server and determine a least loaded portal server in the at least one portal server. In this way, the terminal can perform, by using the first application, authorization and authentication on the terminal based on an address of the least loaded portal server included in the list of portal servers, to achieve load balancing for the at least one portal server.

According to a second aspect, a terminal authentication method is provided, including: receiving, by an access device, an HTTP traffic request sent by a terminal, where the HTTP traffic request is a traffic request initiated by the terminal by using a first application in the terminal; and sending, by the access device if determining that the terminal is an unauthorized terminal, an HTTP traffic response to the terminal, where the HTTP traffic response includes a JavaScript tag, and the JavaScript tag is used for the terminal to obtain an address of a portal server and perform the terminal's authorization and authentication based on the address of the portal server.

If the first application cannot parse the JavaScript tag, even if the access device sends to the terminal an HTTP traffic response including the JavaScript tag after receiving an HTTP traffic request sent by the terminal, the terminal cannot obtain the address of the portal server based on the JavaScript tag by using the first application, and certainly cannot perform the terminal's authorization and authentication. In other words, the terminal does not perform an invalid operation without a result, such as "initiating an HTTP authentication page request to the portal server and completing a TCP handshake and an SSL handshake". This can avoid network resource occupation due to the invalid operation without a result and reduce portal server load.

In a possible implementation of the second aspect, the JavaScript tag includes an address of a management server; or the JavaScript tag includes an address of a management server and an address of a default portal server; or the JavaScript tag includes a list of portal servers, where the list of portal servers includes an address of at least one portal server.

In a possible implementation of the second aspect, that the HTTP traffic response includes the JavaScript tag is: the HTTP traffic response includes HTML information, and the HTML information is embedded with the JavaScript tag. When the HTTP traffic response sent by the access device to the terminal includes the HTML information, the HTML information includes the JavaScript tag. This may be used as a manner of including the JavaScript tag in the HTTP traffic response.

In a possible implementation of the second aspect, before the access device sends the HTTP traffic response to the terminal, the terminal authentication method may further include: receiving, by the access device, the JavaScript tag sent by the management server. The access device may receive HTML information sent by the management server, where the HTML information includes the JavaScript tag. For example, after receiving the HTTP traffic request sent by the terminal, the access device may send an HTML information request to the management server, and receive the HTML information that includes the JavaScript tag and that is delivered by the management server. Alternatively, the access device may send an HTML information request to the management server at startup, and then receive the HTML information that includes the JavaScript tag and that is delivered by the management server. Certainly, the access device may also receive HTML information that includes the JavaScript tag and that is proactively delivered by the management server. It can be figured out that if the access device receives, before sending the HTTP traffic response to the terminal, the HTML information that includes the JavaScript tag and that is delivered by the management server, the access device may send to the terminal the HTTP traffic response including the HTML information, that is, send to the terminal the HTTP traffic response including the JavaScript tag.

According to a third aspect, a terminal authentication method is provided, including: sending, by a management server, a JavaScript tag to an access device, where the JavaScript tag is used for a terminal to obtain an address of a portal server, and perform authorization and authentication on the terminal based on the address of the portal server.

The management server may send the JavaScript tag to the access device, and then the access device sends, to the terminal after receiving an HTTP traffic request sent by the terminal, an HTTP traffic response including the JavaScript tag. In this case, if a first application cannot parse the JavaScript tag, even if the terminal receives the HTTP traffic response including the JavaScript tag, the terminal cannot obtain the address of the portal server based on the JavaScript tag by using the first application, and certainly cannot perform the terminal's authorization and authentication. In other words, the terminal does not perform an invalid operation without a result, such as "initiating an HTTP authentication page request to the portal server and completing a TCP handshake and an SSL handshake". This can avoid network resource occupation due to the invalid operation without a result and reduce portal server load.

In a possible implementation of the third aspect, the JavaScript tag includes an address of the management server. After the management server sends the JavaScript tag to the access device, the terminal authentication method may further include: receiving, by the management server, an authentication address request sent by the terminal, and obtaining an address of a least loaded portal server in portal servers managed by the management server; and sending, by the management server, an authentication address response to the terminal, where the authentication address response includes an address of the least loaded portal server. The management server obtains and sends the address of the least loaded portal server to the terminal, so that the terminal can interact with the least loaded portal server to perform authorization and authentication on the terminal, and load balancing between the at least two portal servers can be achieved.

In a possible implementation of the third aspect, even if the first application in the terminal can parse the JavaScript tag to obtain the address of the management server, for example, a browser can parse the JavaScript tag to obtain the address of the management server, the browser does not necessarily support Ajax, that is, some browsers may support Ajax while some browsers may not support Ajax. Based on this situation, in the terminal authentication method protected by this application, the JavaScript tag may include not only the address of the management server but also an address of a default portal server.

In a possible implementation of the third aspect, the JavaScript tag includes a list of portal servers, where the list of portal servers includes an address of at least one portal server.

According to a fourth aspect, a terminal is provided, where the terminal includes a sending module, a receiving module, an obtaining module, and an authentication module. The sending module is configured to send an HTTP traffic request to an access device, where the HTTP traffic request is a traffic request initiated by using a first application in the terminal. The receiving module is configured to receive an HTTP traffic response sent by the access device, where the HTTP traffic response is sent by the access device after the access device determines that the terminal is an unauthorized terminal, and the HTTP traffic response includes a JavaScript tag. The obtaining module is configured to obtain an address of a portal server based on the JavaScript tag by using the first application. The authentication module is configured to: if the obtaining module obtains the address of the portal server based on the JavaScript tag by using the first application, perform authorization and authentication on the terminal based on the address of the portal server that is obtained by the obtaining module.

In a possible implementation of the fourth aspect, the authentication module is further configured to execute a JavaScript script by using the first application, and redirect to a terminal authentication page of the portal server based on the address of the portal server, to perform the terminal's authorization and authentication.

In a possible implementation of the fourth aspect, the JavaScript tag includes an address of a management server; and the obtaining module is further configured to obtain the address of the management server from the JavaScript tag by using the first application, and execute an Ajax script based on the address of the management server by using the first application, to obtain, from the management server, an address of a least loaded portal server in portal servers managed by the management server.

In a possible implementation of the fourth aspect, the authentication module is further configured to: if the first application does not support Ajax, perform authorization and authentication on the terminal based on an address of a default portal server by using the first application.

In a possible implementation of the fourth aspect, the JavaScript tag includes a list of portal servers, and the list of portal servers includes an address of at least one portal server, and the obtaining module is further configured to obtain, from the JavaScript tag by using the first application, an address of any portal server included in the list of portal servers.

In a possible implementation of the fourth aspect, that the HTTP traffic response received by the receiving module includes the JavaScript tag is: the HTTP traffic response received by the receiving module includes HTML information, and the HTML information is embedded with the JavaScript tag.

According to a fifth aspect, a terminal is provided, including a processor, a memory, a bus, and a communications interface, where the processor, the memory, and the communications interface are connected to each other by using the bus. The memory is configured to store computer program code, where the computer program code includes an instruction. When the processor of the terminal executes the instruction, the terminal performs the terminal authentication method in any one of the first aspect or various possible implementations of the first aspect.

According to a sixth aspect, a computer storage medium is provided. The computer storage medium stores computer program code, and the computer program code includes an instruction. When a processor of a terminal executes the instruction, the terminal performs the terminal authentication method in any one of the first aspect or various possible implementations of the first aspect.

It should be noted that, for detailed descriptions of modules in the terminal in the fourth aspect and the fifth aspect and analysis of corresponding technical effects, refer to the detailed descriptions in the first aspect and the possible implementations of the first aspect. Details are not repeated in this application.

According to a seventh aspect, this application provides an access device, where the access device includes a receiving module, a determining module, and a sending module. The receiving module is configured to receive an HTTP traffic request sent by a terminal, where the HTTP traffic request is a traffic request initiated by the terminal by using a first application in the terminal. The determining module is configured to determine whether the terminal is an unauthorized terminal. The sending module is configured to send an HTTP traffic response to the terminal, where the HTTP traffic response includes a JavaScript tag, and the JavaScript tag is used for the terminal to obtain an address of a portal server and perform the terminal's authorization and authentication based on the address of the portal server.

In a possible implementation of the seventh aspect, that the HTTP traffic response sent by the sending module includes the JavaScript tag is: the HTTP traffic response sent by the sending module includes HTML information, and the HTML information is embedded with the JavaScript tag.

In a possible implementation of the seventh aspect, the receiving module is further configured to: before the sending module sends the HTTP response to the terminal, receive the JavaScript tag delivered by the management server.

According to an eighth aspect, an access device is provided, including a processor, a memory, a bus, and a communications interface, where the processor, the memory, and the communications interface are connected to each other by using the bus. The memory is configured to store computer program code, where the computer program code includes an instruction. When the processor of the access device executes the instruction, the access device performs the terminal authentication method in any one of the second aspect or various possible implementations of the second aspect.

According to a ninth aspect, a computer storage medium is provided. The computer storage medium stores computer program code, and the computer program code includes an instruction. When a processor of an access device executes the instruction, the access device performs the terminal authentication method in any one of the second aspect or the possible implementations of the second aspect.

It should be noted that, for detailed descriptions of modules in the access device in the eighth aspect and the ninth aspect and analysis of corresponding technical effects, refer to the detailed descriptions in the second aspect and the various possible implementations of the second aspect. Details are not repeated in this application.

According to a tenth aspect, this application provides a management server, where the management server includes a sending module. The sending module is further configured to send a JavaScript tag to an access device, where the JavaScript tag is used for a terminal to obtain an address of a portal server and perform authorization and authentication on the terminal based on the address of the portal server.

In a possible implementation of the tenth aspect, the JavaScript tag includes an address of a management server, or the JavaScript tag includes an address of a management server and an address of a default portal server; and the management server further includes a receiving module and an obtaining module. The receiving module is configured to: after the sending module sends the JavaScript tag to the access device, receive an authentication address request sent by the terminal. The obtaining module is configured to: after the receiving module receives the authentication address request sent by the terminal, obtain an address of a least loaded portal server in portal servers managed by the management server. The sending module is further configured to send an authentication address response to the terminal, where the authentication address response includes the address of the least loaded portal server.

In a possible implementation of the tenth aspect, the JavaScript tag that is sent by the sending module to the access device includes a list of portal servers, where the list of portal servers includes an address of at least one portal server.

According to an eleventh aspect, a management server is provided, including a processor, a memory, a bus, and a communications interface, where the processor, the memory, and the communications interface are connected to each other by using the bus. The memory is configured to store computer program code, where the computer program code includes an instruction. When the processor of the management server executes the instruction, the management server performs the terminal authentication method in any one of the third aspect or the possible implementations of the third aspect.

According to a twelfth aspect, a computer storage medium is provided. The computer storage medium stores computer program code, and the computer program code includes an instruction. When a processor of a management server executes the instruction, the management server performs the terminal authentication method in any one of the third aspect or the possible implementations of the third aspect.

It should be noted that, for detailed descriptions of modules in the management server in the tenth aspect and the eleventh aspect and analysis of corresponding technical effects, refer to the detailed descriptions in the third aspect and the possible implementations of the third aspect. Details are not repeated in this application.

BRIEF DESCRIPTION OF DRAWINGS

To describe the technical solutions in this application more clearly, the following briefly describes the accompanying drawings for the embodiments. The accompanying drawings in the following description show merely some embodiments of the present disclosure.

DESCRIPTION OF EMBODIMENTS

In descriptions of the present disclosure, unless otherwise specified, "at least two" or "a plurality of" means two or more. For example, at least two terminals means two or more terminals, and a plurality of portal servers means two or more portal servers.

In addition, the terms "including", "containing", or any other variant thereof mentioned in descriptions of the present disclosure, are intended to cover a non-exclusive inclusion. For example, a process, a method, a system, a product, or a device that includes a series of steps or units is not limited to the listed steps or units, but optionally further includes other unlisted steps or units, or optionally further includes another inherent step or unit of the process, the method, the product, or the device.

The following describes the technical solutions in the embodiments of the present disclosure in detail with reference to the accompanying drawings in the embodiments of the present disclosure. The described embodiments are merely some but not all of the embodiments of the present disclosure.

A terminal authentication method and a device provided by the embodiments of the present disclosure may be applied to a process in which authorization and authentication is performed for an unauthorized terminal to obtain network permission.

Figure 1:
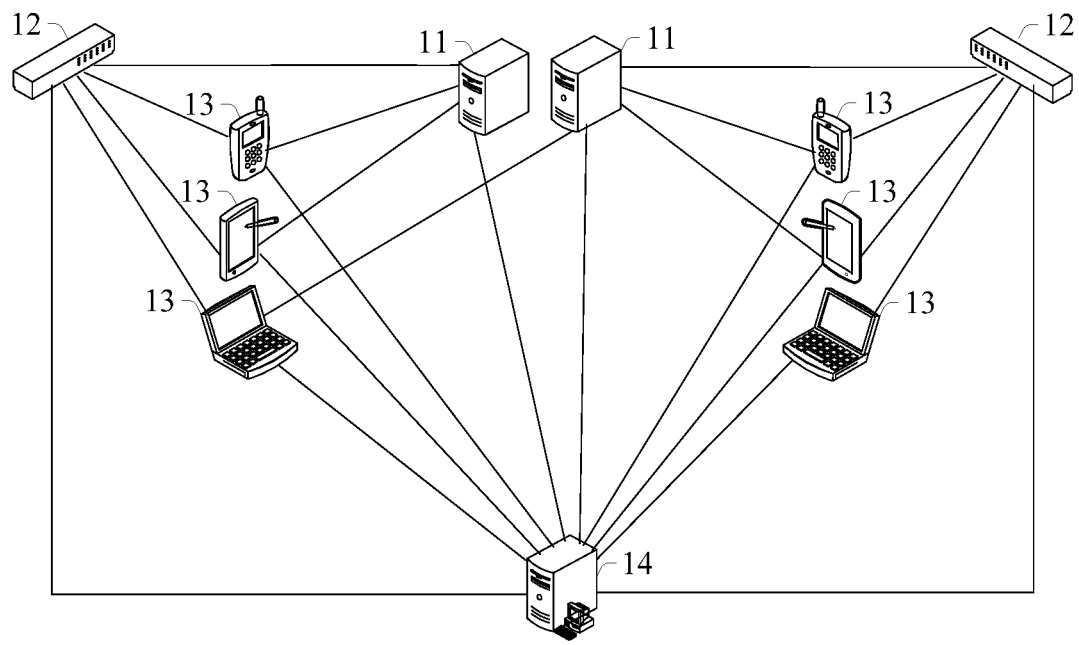
FIG. 1 is a schematic architectural diagram of an authorization and authentication network according to an embodiment of the present disclosure.

Referring to FIG. 1, FIG. 1 is a schematic architectural diagram of an authorization and authentication network according to an embodiment of the present disclosure. As shown in FIG. 1, the authorization and authentication network includes at least two portal servers 11, at least one access device 12, at least one terminal 13, and a management server 14. The management server 14 is configured to manage the at least two portal servers 11.

In the embodiment of the present disclosure herein, a terminal authorization and authentication method is described by using an example in which the terminal authorization and authentication is implemented through interactions between a portal server 11, an access device 12, a terminal 13, and a management server 14.

The terminal 13 is configured to initiate an HTTP traffic request to the access device 12. The access device 12 is configured to: after receiving the HTTP traffic request initiated by the terminal 13, send an HTTP traffic response including an address of the management server 14 to the terminal 13 if determining that the terminal 13 is an unauthorized terminal. The terminal 13 is configured to obtain, from the management server 14 based on the address of the management server 14, an address of one of the portal servers 11 managed by the management server 14, and perform authorization and authentication for the terminal 13 based on the address of the portal server 11.

Figure 2:
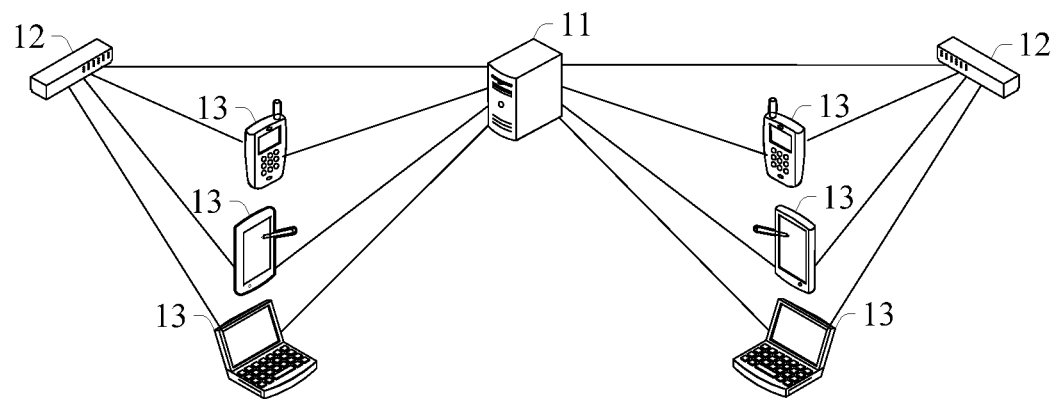
FIG. 2 is a schematic architectural diagram of another authorization and authentication network according to an embodiment of the present disclosure.

Referring to FIG. 2, FIG. 2 is a schematic architectural diagram of another authorization and authentication network according to an embodiment of the present disclosure. The authorization and authentication network includes a portal server 11, at least one access device 12, and at least one terminal 13.

In the embodiment of the present disclosure herein, a terminal authorization and authentication method is described by using an example in which the terminal authorization and authentication is implemented through interactions between the portal server 11, an access device 12, and a terminal 13.

The terminal 13 is configured to initiate an HTTP traffic request to the access device 12. The access device 12 is configured to: after receiving the HTTP traffic request initiated by the terminal 13, send an HTTP traffic response including an address of the portal server 11 to the terminal 13 if determining that the terminal 13 is an unauthorized terminal; and perform authorization and authentication for the terminal 13 based on the address of the portal server 11.

For example, the access device 12 may be a device capable of providing a network access service for the terminal, such as a switch or a firewall. In the embodiment of the present disclosure, FIG. 1 and FIG. 2 merely use the switch as an example to illustrate an interaction procedure between the access device 12 and another device in the authorization and authentication network. The terminal 13 in the embodiment of the present disclosure may be a terminal device such as a personal computer (PC), a mobile phone, a tablet computer, or a portable computer.

In the embodiment of the present disclosure, the HTTP traffic response sent by the access device 12 to the terminal 13 in the authorization and authentication network shown in FIG. 1 or FIG. 2 includes a JavaScript tag. The unauthorized terminal may obtain the address of the portal server based on the JavaScript tag by using a first application, and perform authorization and authentication on the terminal based on the address of the portal server.

The terminal authentication method provided by the embodiment of the present disclosure may be based on a principle that "the terminal can parse the JavaScript tag by using some application programs (such as a browser) but cannot parse the JavaScript tag by using some other application programs". When the first application cannot parse the JavaScript tag, the terminal may be prevented from continuing to perform an invalid operation without a result, such as "initiating an HTTP authentication page request to the portal server and completing a TCP handshake and an SSL handshake", after the terminal initiates the HTTP traffic request by using the first application and receives the HTTP traffic response. This can avoid network resource occupation due to the invalid operation without a result and reduce portal server load.

A terminal authentication method and a device provided by the embodiments of the present disclosure is described in detail below with reference to the accompanying drawings by using specific embodiments and application scenarios thereof.

Figure 3:
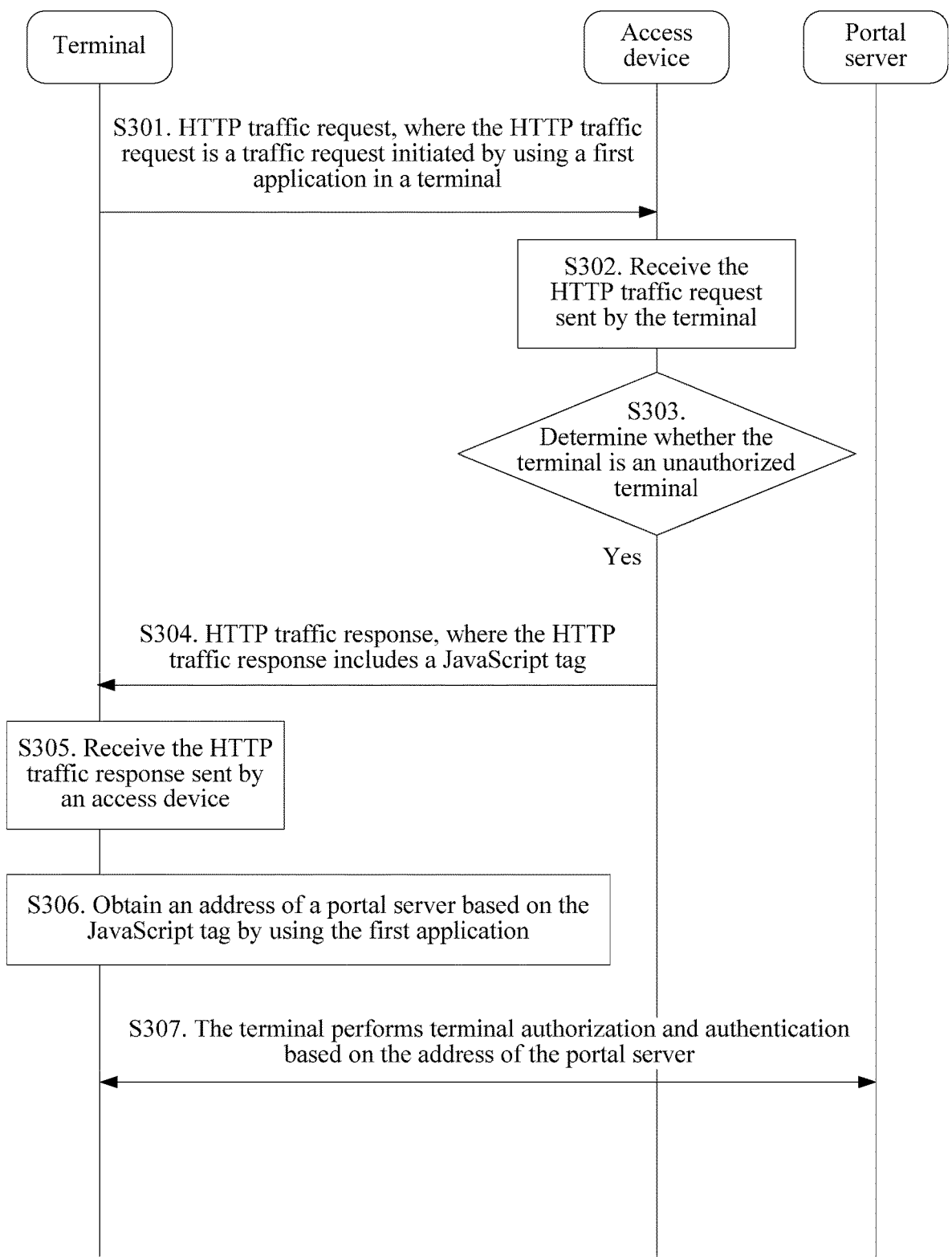
FIG. 3 is a flowchart of a terminal authentication method according to an embodiment of the present disclosure.

An embodiment of the present disclosure provides a terminal authentication method. As shown in FIG. 3, the terminal authentication method includes S301 to S307.

S301. A terminal sends an HTTP traffic request to an access device, where the HTTP traffic request is a traffic request initiated by using a first application in the terminal.

The first application in the embodiment of the present disclosure may be an application program that can parse a JavaScript tag, or the first application may be an application program that cannot parse a JavaScript tag.

For example, it is assumed that only a browser has a function of parsing the JavaScript tag. When the first application is a browser, the terminal can parse the JavaScript tag by using the first application; when the first application is an application program other than a browser on the terminal, the terminal cannot parse the JavaScript tag by using the first application. The browser may be a Microsoft Internet Explorer (IE) browser or a non-IE browser installed in the terminal.

S302. The access device receives the HTTP traffic request sent by the terminal.

S303. The access device determines whether the terminal is an unauthorized terminal.

It can be figured out that the HTTP traffic request in the embodiment of the present disclosure may be a service request initiated by the terminal to a service server. The service server may be a base station, and the corresponding service request may be a voice or video communication request initiated by the terminal to another terminal by using the base station. Alternatively, the service server may be a server capable of providing other web resources for the terminal, and the corresponding service request may be a web page resource request message initiated by the terminal to the server.

The terminal initiating the HTTP traffic request to the access device may be an authorized terminal or an unauthorized terminal. After receiving an HTTP traffic request initiated by an authorized terminal, the access device may directly forward the HTTP traffic request to a corresponding service server, so that the service server can provide corresponding service data for the terminal based on the HTTP traffic request; after receiving an HTTP traffic request initiated by an unauthorized terminal, the access device needs to provide an address of a portal server to the unauthorized terminal, so that the unauthorized terminal interacts with the portal server to perform its authorization and authentication.

For example, a method for determining, by the access device, whether the terminal is an unauthorized terminal may include: after receiving an HTTP traffic request initiated by a terminal, querying, by the access device, whether an identifier of an authorized terminal stored in the access device includes an identifier of the terminal; and if the identifier of the authorized terminal stored in the access device includes the identifier of the terminal, determining, by the access device, that the terminal is an authorized terminal; or if the identifier of the authorized terminal stored in the access device does not include the identifier of the terminal, determining, by the access device, that the terminal is an unauthorized terminal. The identifier of the terminal may be an Internet Protocol (IP) address of the terminal, and the access device may obtain, by parsing the received HTTP traffic request, an IP address of the terminal sending the HTTP traffic request.

The method for determining, by the access device, whether the terminal is an unauthorized terminal includes but is not limited to the foregoing method. For example, the access device may also initiate a permission query request to an authentication server (such as the portal server in the embodiment of the present disclosure) after receiving an HTTP traffic request initiated by a terminal, where the permission query request includes an identifier of the terminal, and the permission query request is used to instruct the authentication server to query whether the terminal is an authorized terminal; and the access device receives a permission query response sent by the authentication server, where the permission query response includes indication information that the terminal is an authorized terminal or an unauthorized terminal.

Specifically, if the terminal is an unauthorized terminal, S304 is performed; or if the terminal is an authorized terminal, the access device forwards the HTTP traffic request to a network side.

S304. The access device sends an HTTP traffic response to the terminal, where the HTTP traffic response includes a JavaScript tag.

That the HTTP traffic response includes a JavaScript tag may be: the HTTP traffic response includes HTML information, and the HTML information is embedded with the JavaScript tag. The JavaScript tag is used for the terminal to obtain the address of the portal server, and perform authorization and authentication on the terminal based on the address of the portal server.

For example, in the embodiment of the present disclosure, the HTTP traffic response sent by the access device to the terminal may be an HTTP 200 response packet. A specific manner of adding the HTML information embedded with the JavaScript tag to the HTTP traffic response may be as follows: A packet body of the HTTP 200 response packet is an HTTP page that includes the JavaScript tag and that is delivered by a management server.

S305. The terminal receives the HTTP traffic response sent by the access device.

S306. The terminal obtains an address of a portal server based on the JavaScript tag by using the first application.

The first application may be an application program that can parse the JavaScript tag, or may be an application program that cannot parse the JavaScript tag. When the first application can parse the JavaScript tag, the terminal may obtain the address of the portal server based on the JavaScript tag by using the first application; or when the first application cannot parse the JavaScript tag, the terminal cannot obtain the address of the portal server based on the JavaScript tag by using the first application. In other words, when the terminal obtains the address of the portal server based on the JavaScript tag by using the first application, there are two results: the obtaining succeeds and the obtaining fails.

It can be figured out that the terminal may perform its authorization and authentication based on the address of the portal server after the terminal successfully obtains the address of the portal server based on the JavaScript tag. Specifically, the terminal authentication method further includes S307.

S307. The terminal performs authorization and authentication on the terminal based on the address of the portal server.

For example, a method for performing, by the terminal, authorization and authentication on the terminal based on the address of the portal server may include: executing, by the terminal, a JavaScript script by using the first application, to initiate an HTTP authentication page request to the portal server based on the address of the portal server; returning, by the portal server, an HTTP authentication page to the terminal after completing a TCP handshake and an SSL handshake with the terminal; and loading and displaying, by the terminal, the HTTP authentication page, receiving authentication information input by a user on the HTTP authentication page, and sending the authentication information to the portal server, to perform the authorization and authentication.

In the embodiment of the present disclosure herein, that the first application is a browser in the terminal is merely used as an example. Currently, most browsers support JavaScript, that is, they can parse JavaScript and execute the JavaScript script. In a solution protected by the embodiment of the present disclosure, the terminal uses the browser to execute the JavaScript script and can exchange data with the portal server without reloading an entire page. That is, a local refresh can be achieved without refreshing the entire page. Compared with reloading the entire page, reloading a part of the page by the terminal has less data to be loaded. Therefore, network load can be reduced and network congestion can be relieved. In other words, when the terminal executes the JavaScript script by using the browser, a possibility of network congestion during authorization and authentication can be reduced. Similarly, when the first application can parse the JavaScript tag, the terminal executes the JavaScript script by using the first application (which may be an application program that can parse the JavaScript tag other than the browser). This can reduce a possibility of network congestion during the terminal's authorization and authentication.

In the terminal authentication method provided by the embodiment of the present disclosure, some application programs (such as a browser) in the terminal can parse the JavaScript tag while some application programs cannot parse the JavaScript tag. Therefore, the terminal may obtain the address of the portal server based on the JavaScript tag only when the first application of the terminal can parse the JavaScript tag. When the first application of the terminal cannot parse the JavaScript tag, the terminal cannot obtain the address of the portal server based on the JavaScript tag. It can be learned that with this solution, even if the terminal proactively initiates the HTTP traffic request to the access device by using the first application and receives the HTTP traffic response including the JavaScript tag, the terminal cannot perform an invalid operation without a result, such as "initiating an HTTP authentication page request to the portal server and completing a TCP handshake and an SSL handshake", if the terminal cannot obtain, based on the JavaScript tag by using the first application, the address of the portal server used for the terminal's authorization and authentication. This can avoid network resource occupation due to the invalid operation without a result and reduce portal server load.

Figure 4:
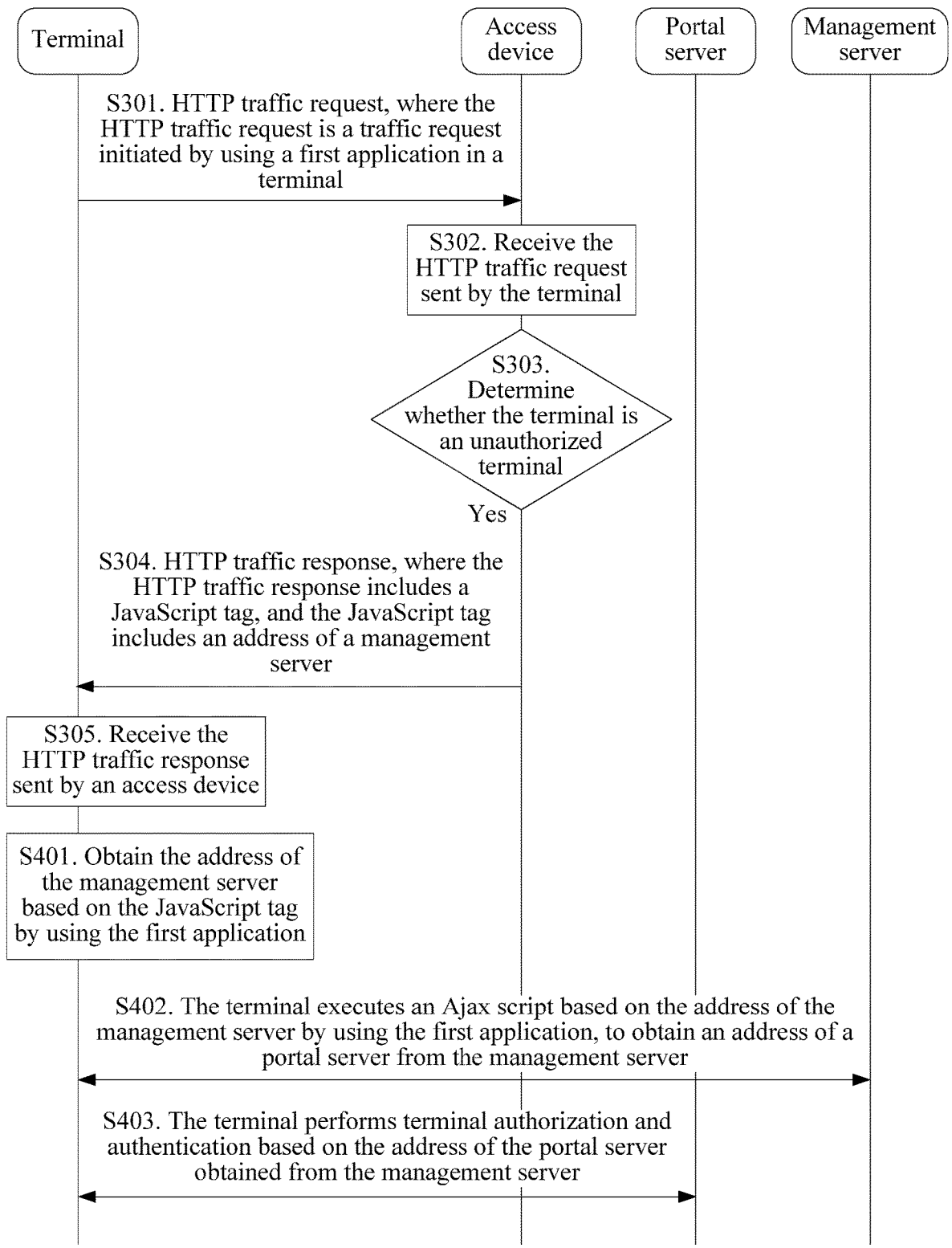
FIG. 4 is a flowchart of another terminal authentication method according to an embodiment of the present disclosure.

In a first application scenario of the embodiment of the present disclosure, the JavaScript tag includes an address of a management server. In this application scenario, assuming that the first application can parse the JavaScript tag, the terminal can obtain the address of the management server by using the first application. As shown in FIG. 4, S306 in FIG. 3 may include S401 and S402, and S307 in FIG. 3 may be replaced by S403.

S401. The terminal obtains the address of the management server based on the JavaScript tag by using the first application.

S402. The terminal executes an Ajax script based on the address of the management server by using the first application, to obtain an address of a portal server from the management server.

In the embodiment of the present disclosure, the address of the portal server that is obtained by the terminal from the management server may be an address of any one of at least two portal servers managed by the management server.

Optionally, the address of the portal server that is obtained by the terminal from the management server based on the address of the management server by executing the Ajax script by using the first application may be an address of a least loaded portal server in the at least two portal servers managed by the management server. It can be figured out that the management server may manage at least two portal servers, that is, the at least two portal servers can provide an authentication service for the terminal, and load of the portal servers may not be the same, for example, some portal servers have higher load while some portal servers have lower load. To achieve load balancing between the at least two portal servers managed by the management server, the terminal may obtain, from the management server based on the address of the management server, the address of the least loaded portal server in the portal servers managed by the management server.

For example, the management server may periodically obtain load information of the at least two portal servers managed by the management server from the at least two portal servers managed by the management server. Alternatively, each of the at least two portal servers may periodically and proactively report its load information to the management server. The load information is used to indicate a load level of the portal server.

S403. The terminal performs authorization and authentication on the terminal based on the address of the portal server obtained from the management server.

Figure 5:
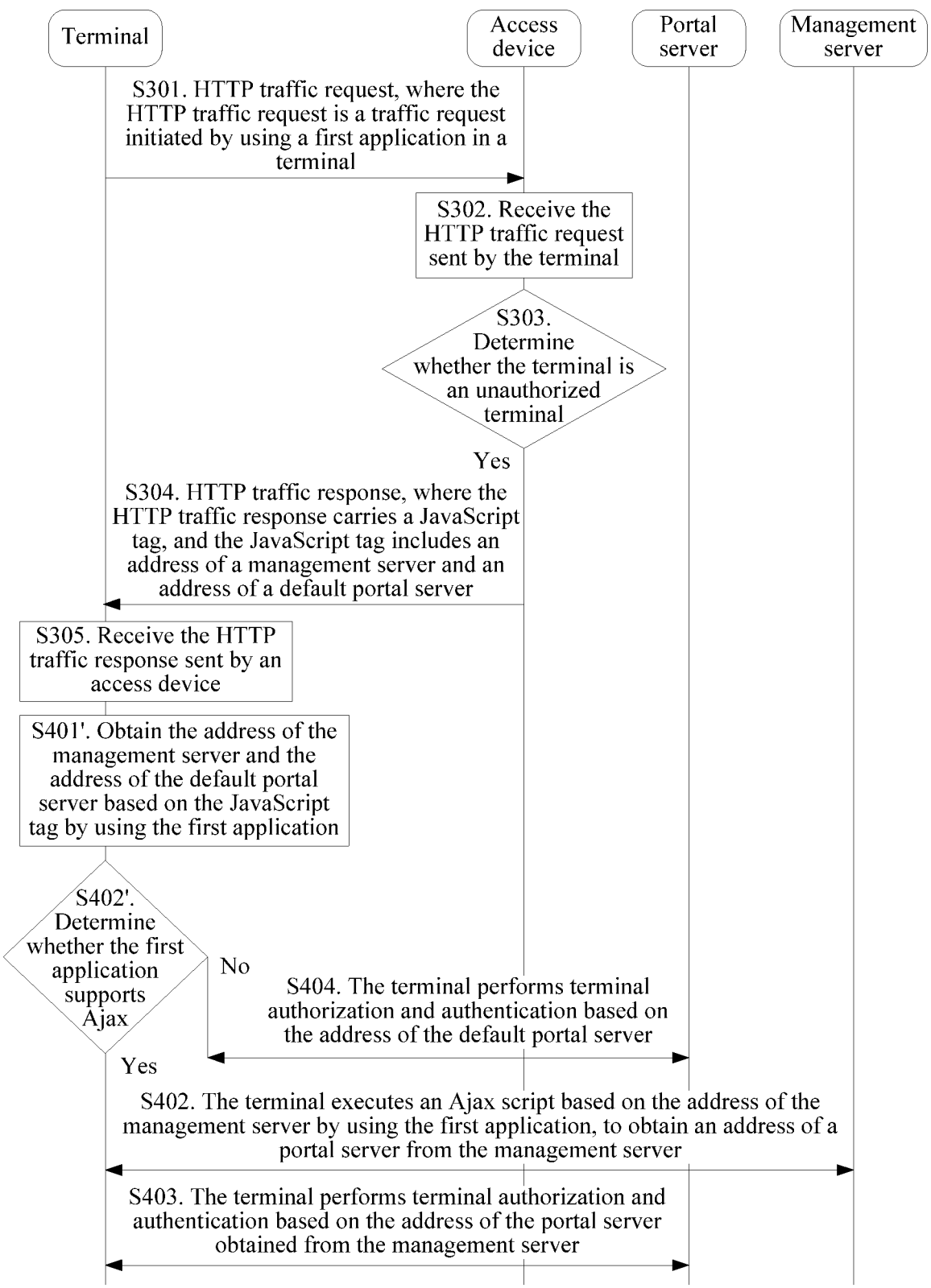
FIG. 5 is a flowchart of another terminal authentication method according to an embodiment of the present disclosure.

Even if the first application in the terminal can parse the JavaScript tag to obtain the address of the management server, for example, a browser can parse the JavaScript tag to obtain the address of the management server, the browser does not necessarily support Ajax. In other words, some browsers may support Ajax while some browsers may not support Ajax. Based on this situation, in the terminal authentication method protected by this application, the JavaScript tag may include not only the address of the management server but also an address of a default portal server. Correspondingly, after obtaining the address of the management server and the address of the default portal server based on the JavaScript tag by using the first application, the terminal may first determine whether the first application supports Ajax. As shown in FIG. 5, S401 in FIG. 4 may be replaced by S401', S402' may be included before S402 in FIG. 4, and S404 may further be included after S402'.

S401'. The terminal obtains the address of the management server and the address of the default portal server based on the JavaScript tag by using the first application.

S402'. The terminal determines whether the first application supports Ajax.

Specifically, when determining that the first application supports Ajax, the terminal may perform its authorization and authentication based on the address of the portal server obtained from the management server, that is, S402 and S403 in FIG. 5 are performed; when determining that the first application does not support Ajax, the terminal may perform its authorization and authentication based on the address of the default portal server, that is, S404 in FIG. 5 is performed.

S404. The terminal performs authorization and authentication on the terminal based on the address of the default portal server.

In the embodiment of the present disclosure, if the first application can parse the JavaScript tag, even if the first application does not support Ajax, and the terminal cannot execute, by using the first application, the Ajax script to obtain the address of the portal server from the management server, the terminal may still redirect to a terminal authentication page of the default portal server based on the address of the default portal server that is obtained based on the JavaScript tag, to perform its authorization and authentication. In other words, no matter whether the first application of the terminal that initiates the HTTP traffic request supports Ajax, the terminal can complete the authorization and authentication, provided that the terminal initiates the HTTP traffic request by using the first application.

Figure 6:
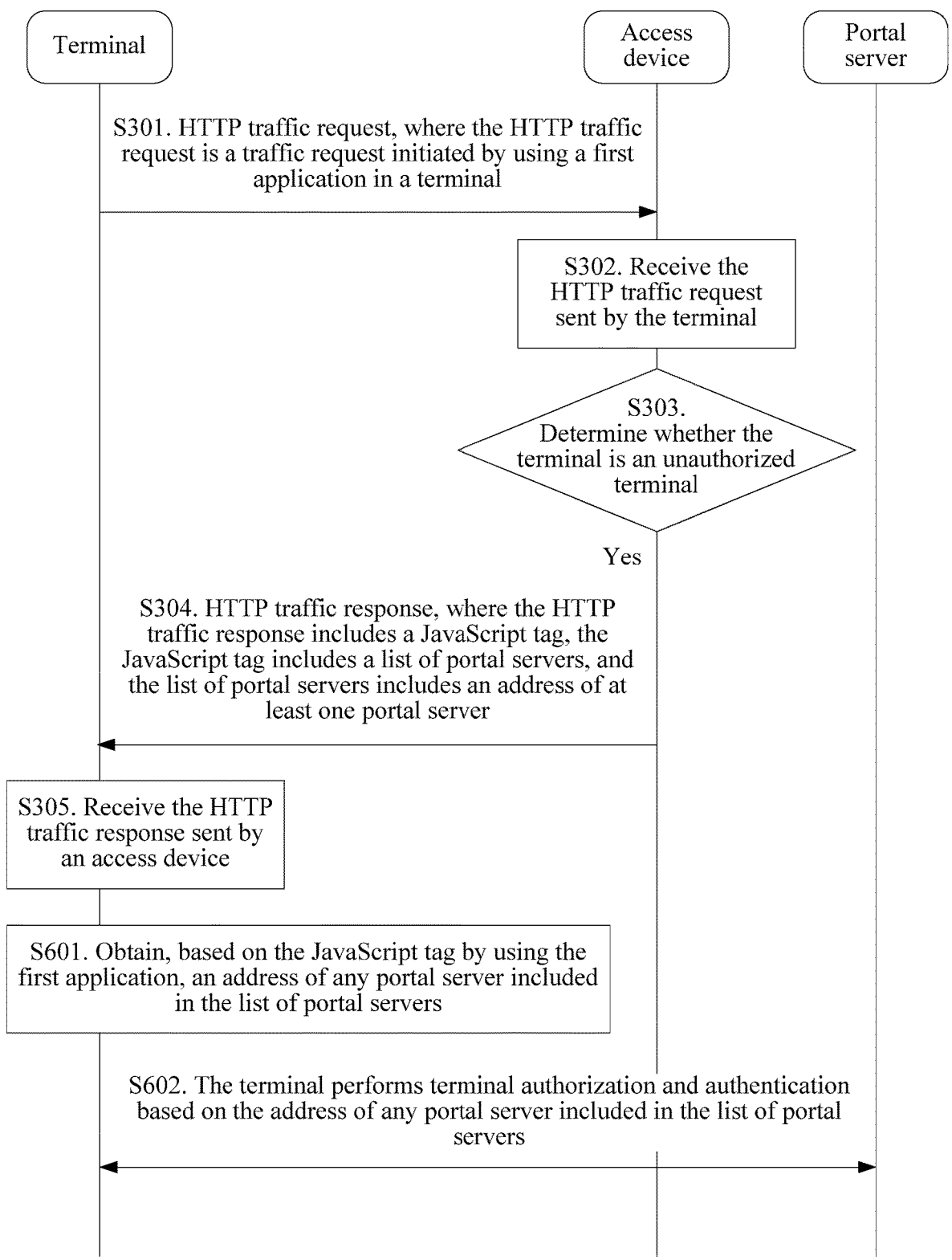
FIG. 6 is a flowchart of another terminal authentication method according to an embodiment of the present disclosure.

In a second application scenario, the JavaScript tag includes a list of portal servers, where the list of portal servers includes an address of at least one portal server. In this application scenario, if the terminal can parse the JavaScript tag by using the first application, the terminal can obtain the address of the at least one portal server based on the JavaScript tag. As shown in FIG. 6, S306 in FIG. 3 may be replaced with S601, and S307 in FIG. 3 may be replaced by S602.

S601. The terminal obtains, based on the JavaScript tag by using the first application, an address of any portal server included in a list of portal servers.

S602. The terminal performs authorization and authentication based on the address of any portal server included in the list of portal servers.

For example, in the embodiment of the present disclosure, the portal server used for the terminal's authorization and authentication may be any one of at least one portal server included in the list of portal servers, or may be a least loaded portal server in at least one portal server included in the list of portal servers.

Figure 7:
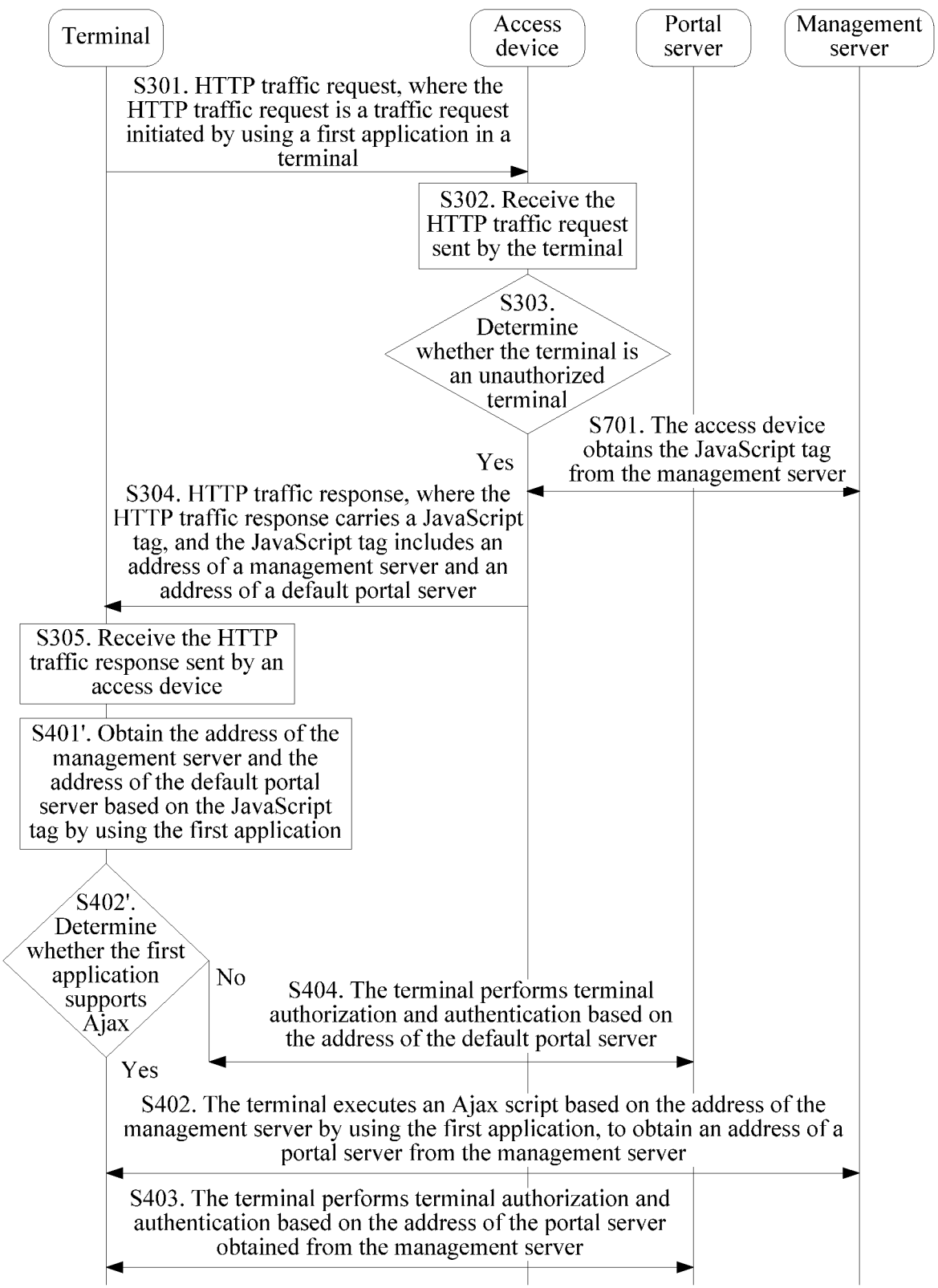
FIG. 7 is a flowchart of another terminal authentication method according to an embodiment of the present disclosure.

Optionally, the JavaScript tag may be preconfigured in the access device. Certainly, the JavaScript tag may also be obtained by the access device from the management server. That is, before S304 in any one of FIG. 3 to FIG. 6, the method of the embodiment of the present disclosure may further include S701. As shown in FIG. 7, in the embodiment of the present disclosure herein, the method of the embodiment of the present disclosure may further include S701 before S304 in FIG. 5. Based on this example, the terminal authentication method provided by the embodiment of the present disclosure is described.

S701. The access device obtains the JavaScript tag from the management server.

For example, the method for obtaining, by the access device, the JavaScript tag from the management server may include: receiving, by the access device, HTML information sent by the management server, where the HTML information is embedded with the JavaScript tag. Specifically, after receiving the HTTP traffic request sent by the terminal, the access device may send an HTML information request to the management server, and then receive the HTML information delivered by the management server. Alternatively, the access device may send an HTML information request to the management server at startup, and then receive the HTML information delivered by the management server. Certainly, the access device may also receive HTML information proactively delivered by the management server. If the access device receives, before sending an HTTP traffic response to the terminal, the HTML information delivered by the management server, the access device may send to the terminal the HTTP traffic response including the HTML information embedded with the JavaScript tag, that is, send to the terminal the HTTP traffic response including the JavaScript tag.

To prevent the access device from sending an HTML information request to the management server each time the access device receives an HTTP traffic request sent by the terminal, the access device may determine, after receiving an HTTP traffic request, whether the HTML information is stored in the access device. If no HTML information is stored in the access device, the access device sends an HTML information request to the management server, obtains the HTML information from the management server, and stores the HTML information. If the HTML information is stored in the access device, the access device directly returns to the terminal the HTTP traffic response including the HTML information stored in the access device.

Methods and occasions for obtaining the HTML information from the management server by the access device include but are not limited to the methods and the occasions enumerated in the foregoing implementations. For example, the access device may also receive the HTML information proactively delivered by the management server.

The access device may obtain the JavaScript tag from the management server before receiving the HTTP traffic request sent by the terminal, or may obtain the JavaScript tag from the management server after receiving the HTTP traffic request sent by the terminal. That is, in the embodiment of the present disclosure, S301 to S303 may be performed before S701, or S701 may be performed before S301 to S303. An order of performing S301 to S303 and S701 is not limited in the embodiment of the present disclosure.

For example, in the embodiment of the present disclosure herein, a code instance of the terminal authentication method provided by the embodiment of the present disclosure is provided by using an example in which the JavaScript tag includes the address of the management server and the address of the default portal server and the JavaScript tag is included in the HTML information:

```
<html><head>  // HTML markup language//
<script type="text=text/javascript">   //Start tag of an embedded JavaScript script//
var defaultWebUrl="http://IP:PORT/webAuth"; //Define the address of the default
portal server. When the browser used by the terminal does not support Ajax, execute
a JavaScript script to redirect to the default portal server for portal authentication//
loadWebUrl('http://IP:PORT/server_list')        //Obtain a less loaded portal server
from the management server//
var xmlhttp;
function loadWebUrl(url)
{
    xmlhttp=null;
    If (window.XMLhttpRequest)       //Determine whether a non-IE browser
    supports Ajax//
    {
        Xmlhttp=new XML http Request( ); //The non-IE browser supports Ajax//
    }
    else If (window.ActiveXObject) //Determine whether an IE browser supports Ajax//
    {
        Xmlhttp=new Active X Object("Microsoft. XML HTTP"); //Executed
        when the IE browser supports Ajax//
    }
    If (xmlhttp!=null)   //If the browser of the terminal (including the IE browser or
    the non-IE browser) supports Ajax, execute Ajax by using the browser, to obtain a
    less loaded portal server from the management server//
    {
        Xmlhttp .on ready state change=web Redirect;   //After obtaining a
        least loaded portal server by using the browser, the terminal invokes a web
        Redirect method to redirect the browser to an address of a specified portal
        server//
        Xml http.open("GET",url,true);
        xmlhttp.send(null);
    }
    else
    {
        location.replace(defaultWebUrl);   //If the browser does not support
        Ajax, the browser is redirected to the address of the default portal server//
    }
}
function webRedirect ( ) //Execute Ajax to parse the address of the portal server
obtained from the management server//
{
    If(xmlhttp.readyState==4&&xmlhttp.Status==200) //Execute Ajax to query
    whether the operation succeeds//
    {
Server=xmlhttp.responseXML.documenctElement.getElementByTaName("sever");
webUrl=server[0].getElementByTaName("URL")[0].firstChild.nodeValvue; //The
terminal parses, by using the browser, the address of the portal server obtained from
the management server//
location.replace(webUrl); //If parsing succeeds, redirect to the obtained portal
address//
    }
    else
    {
        location.replace(defaultWebUrl); //If parsing fails, redirect to the default
        portal address//
    }
}
```

Text in two "//" symbols in the above code segment is an explanation of the corresponding code segment.

In the terminal authentication method provided by the embodiment of the present disclosure, some application programs (such as a browser) in the terminal can parse the JavaScript tag while some application programs cannot parse the JavaScript tag. Therefore, the terminal may obtain the address of the portal server based on the JavaScript tag only when the first application of the terminal can parse the JavaScript tag. When the first application of the terminal cannot parse the JavaScript tag, the terminal cannot obtain the address of the portal server based on the JavaScript tag. It can be learned that with this solution, even if the terminal proactively initiates the HTTP traffic request to the access device by using the first application and receives the HTTP traffic response including the JavaScript tag, the terminal cannot perform an invalid operation without a result, such as "initiating an HTTP authentication page request to the portal server and completing a TCP handshake and an SSL handshake", if the terminal cannot obtain, based on the JavaScript tag by using the first application, the address of the portal server used for the terminal's authorization and authentication. This can avoid network resource occupation due to the invalid operation without a result and reduce portal server load.

Further, the terminal can perform authorization and authentication based on the address of the least loaded portal server, thereby achieving load balancing between portal servers.

The above mainly describes, in terms of interaction between network elements, the solutions provided by the embodiments of the present disclosure. It can be understood that, to implement the foregoing functions, the network elements such as the terminal, the access device, and the management server include corresponding hardware structures and/or software modules for performing the functions.

A person skilled in the art should be easily aware that, with reference to the examples described in the embodiments disclosed herein, units and algorithm steps can be implemented in a form of hardware or a combination of hardware and computer software in the present disclosure. Whether the functions are implemented by hardware or computer software driving hardware depends on particular applications and design constraint conditions of the technical solutions. A person skilled in the art may use a different method to implement the described functions for each particular application, but it should not be considered that the implementation goes beyond the scope of the present disclosure.

In the embodiments of the present disclosure, the terminal and the access device may be divided into modules based on the foregoing method examples. For example, the modules are divided based on corresponding functions, or two or more functions may be integrated into one processing module. The integrated module may be implemented in a form of hardware, or may be implemented in a form of a software module. It should be noted that the module division in the embodiments of the present disclosure is used as an example, and is merely logical function division. There may be other division manners during actual implementation.

Figure 8:
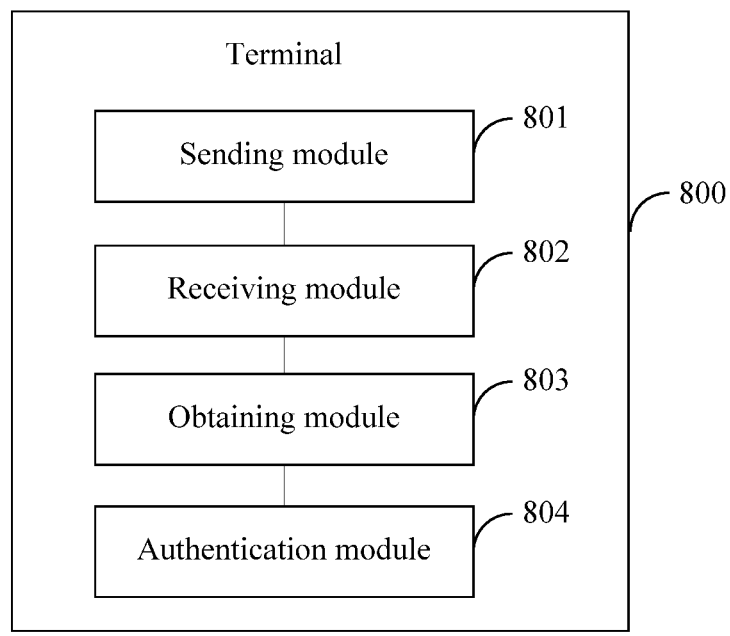
FIG. 8 is a schematic structural diagram of a terminal according to an embodiment of the present disclosure.

FIG. 8 shows a possible schematic structural diagram of a terminal used in the foregoing embodiments. As shown in FIG. 8, the terminal 800 includes a sending module 801, a receiving module 802, an obtaining module 803, and an authentication module 804.

The sending module 801 is configured to send a request message or data to an access device, a management server, and a portal server. For example, the sending module 801 may send an HTTP traffic request to the access device. For example, the sending module 801 is configured to: when S301 in any one of FIG. 3 to FIG. 7, and the terminal's authorization and authentication in S307 in FIG. 3, S403 in FIG. 4, FIG. 5 and FIG. 7, S404 in FIG. 5, and S602 in FIG. 6 are performed, send a request message or data to the access device for the terminal; and when the terminal obtains an address of the portal server from the management server in S402 in FIG. 4, FIG. 5 and FIG. 7, send a request message or data to the management server for the terminal; and/or is used in other processes of the technology described herein.

The receiving module 802 is configured to receive a response message or data sent by the access device, the management server, and the portal server. For example, the receiving module 802 may be configured to receive an HTTP traffic response sent by the access device. For example, the receiving module 802 is configured to: when S305 in FIG. 3, FIG. 4, FIG. 5, FIG. 6, and FIG. 7, and the terminal's authorization and authentication in S307 in FIG. 3, S403 in FIG. 4, FIG. 5 and FIG. 7, S404 in FIG. 5, and S602 in FIG. 6 are performed, receive a response message or data sent by the access device for the terminal; and when the terminal obtains the address of the portal server from the management server in S402 in FIG. 4, FIG. 5 and FIG. 7, receive a response message or data sent by the management server for the terminal; and/or is used in other processes of the technology described herein.

The obtaining module 803 is configured to obtain the address of the portal server based on a JavaScript tag by using a first application. For example, the obtaining module 803 is configured to support the terminal in performing S306 in FIG. 3, S401 and S402 in FIG. 4 and FIG. 5, S401' and S402' in FIG. 5, and S601 in FIG. 6, and/or is used in other processes of the technology described herein.

The authentication module 804 is configured to perform authorization and authentication on the terminal based on the address of the portal server obtained by the obtaining module 803. For example, the authentication module 804 is configured to support the terminal in performing S307 in FIG. 3, S403 in FIG. 4, S404 in FIG. 5, and S602 in FIG. 6, and/or is used in other processes of the technologies described herein.

Further, the terminal 800 may further include a storage module configured to store program code and data of the terminal 800.

If an integrated module is used, the sending module 801 and the receiving module 802 may be integrated into one communications module for implementation. The communications module may be a communications interface, a transceiver circuit, a transceiver, or the like. The obtaining module 803 and the authentication module 804 may be integrated into a processing module for implementation. The processing module may be a processor or a controller, for example, a CPU, a general purpose processor, a digital signal processor (DSP), an application-specific integrated circuit (ASIC), a field-programmable gate array (FPGA) or another programmable logic device, a transistor logic device, a hardware component, or any combination thereof. The processing module may implement or execute various illustrative logical blocks, modules, and circuits described with reference to the content disclosed in the present disclosure. The processing module may also be a combination for implementing computing functions, such as a combination of one or more microprocessors, a combination of a DSP and a microprocessor, or the like. The storage module may be a memory.

Figure 9:
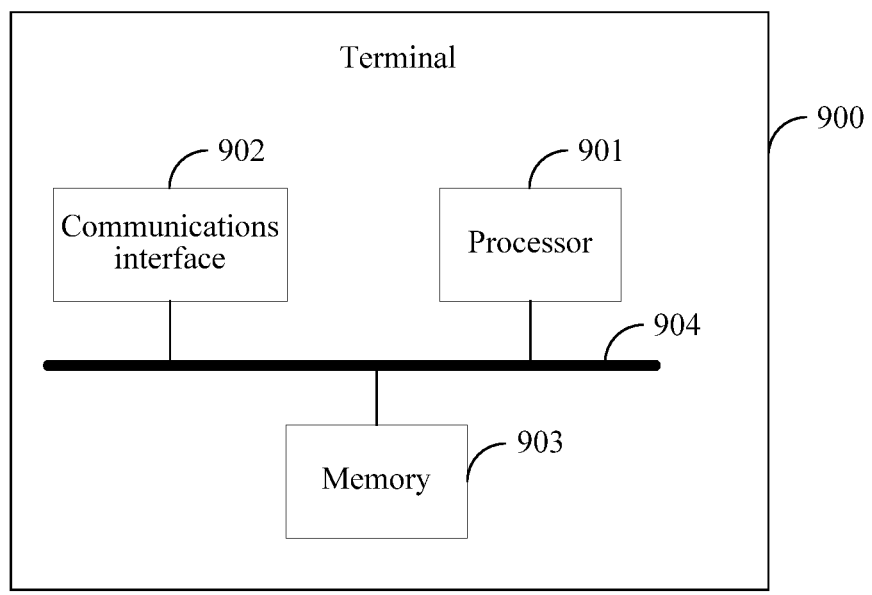
FIG. 9 is another schematic structural diagram of a terminal according to an embodiment of the present disclosure.

When the processing module is a processor, the communications module is a communications interface, and the storage module is a memory, the terminal in the embodiment of the present disclosure may be a terminal 900 shown in FIG. 9.

Referring to FIG. 9, the terminal 900 includes a processor 901, a communications interface 902, a memory 903, and a bus 904. The processor 901, the communications interface 902, and the memory 903 are connected to each other by using the bus 904. The bus 904 may be classified into an address bus, a data bus, a control bus, and the like. For ease of illustration, only one bold line is shown in FIG. 9, but it does not mean that there is only one bus or one type of bus.

An embodiment of the present disclosure further provides a computer storage medium. The computer storage medium stores computer program code, and the computer program code includes an instruction. When the processor 901 of the terminal 900 executes the instruction, the terminal 900 executes the related method steps shown in any one of FIG. 3, FIG. 4, FIG. 5, FIG. 6, or FIG. 7, to interact with an access device and a management server to implement the terminal's authorization and authentication.

For detailed descriptions of functional units or modules in the terminal provided by the embodiment of the present disclosure, and technical effects achieved after related method steps in any one of FIG. 3, FIG. 4, FIG. 5, FIG. 6, or FIG. 7 are performed by the functional units or modules, refer to related descriptions in the method embodiments of the present disclosure. Details are not described herein again.

Figure 10:
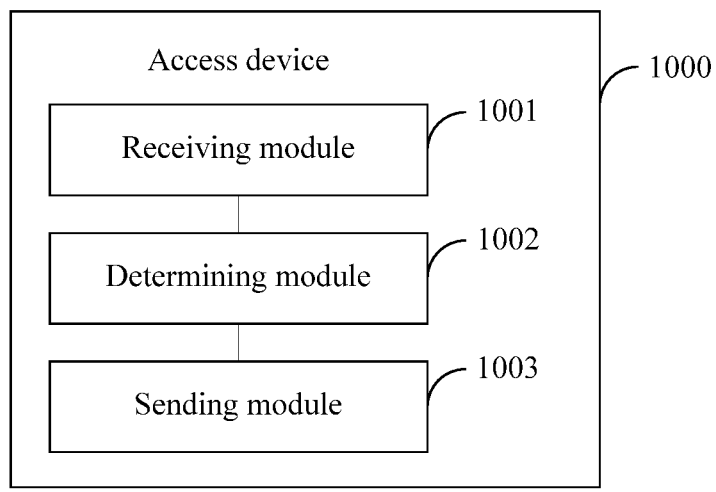
FIG. 10 is a schematic structural diagram of an access device according to an embodiment of the present disclosure.

FIG. 10 is a possible schematic structural diagram of an access device in the foregoing embodiments. As shown in FIG. 10, the access device 1000 includes a receiving module 1001, a determining module 1002, and a sending module 1003.

The receiving module 1001 is configured to receive a message or data sent by a device such as a terminal and a management server. For example, the receiving module 1001 may be configured to receive an HTTP traffic request sent by the terminal. For example, the receiving module 1001 is configured to support the access device in performing S302 in FIG. 3, FIG. 4, FIG. 5, FIG. 6, and FIG. 7, and S701 in FIG. 7, and/or is used in other processes of the technology described herein.

The determining module 1002 is configured to determine that the terminal is an unauthorized terminal. For example, the determining module 1002 is configured to support the access device in performing S303 in FIG. 3, FIG. 4, FIG. 5, FIG. 6, and FIG. 7, and/or is used in other processes of the technology described herein.

The sending module 1003 is configured to send a message or data to a device such as the terminal and the management server. For example, the sending module 1003 may be configured to send an HTTP traffic response to the terminal. For example, the sending module 1003 is configured to support the access device in performing S304 in FIG. 3, FIG. 4, FIG. 5, FIG. 6, and FIG. 7, and/or is used in other processes of the technology described herein.

Further, the access device 1000 may further include a storage module configured to store program code and data of the access device 1000.

If an integrated module is used, the receiving module 1001 and the sending module 1003 may be integrated into one communications module for implementation. The communications module may be a communications interface, a transceiver circuit, a transceiver, or the like. The determining module 1002 may be integrated into one processing module for implementation. The processing module may be a processor or a controller, such as a CPU, a general purpose processor, a DSP, an ASIC, an FPGA or another programmable logic device, a transistor logic device, a hardware component, or any combination thereof. The processing module may implement or execute various illustrative logical blocks, modules, and circuits described with reference to the content disclosed in the present disclosure. The processing module may also be a combination for implementing computing functions, such as a combination of one or more microprocessors, a combination of a DSP and a microprocessor, or the like. The storage module may be a memory.

Figure 11:
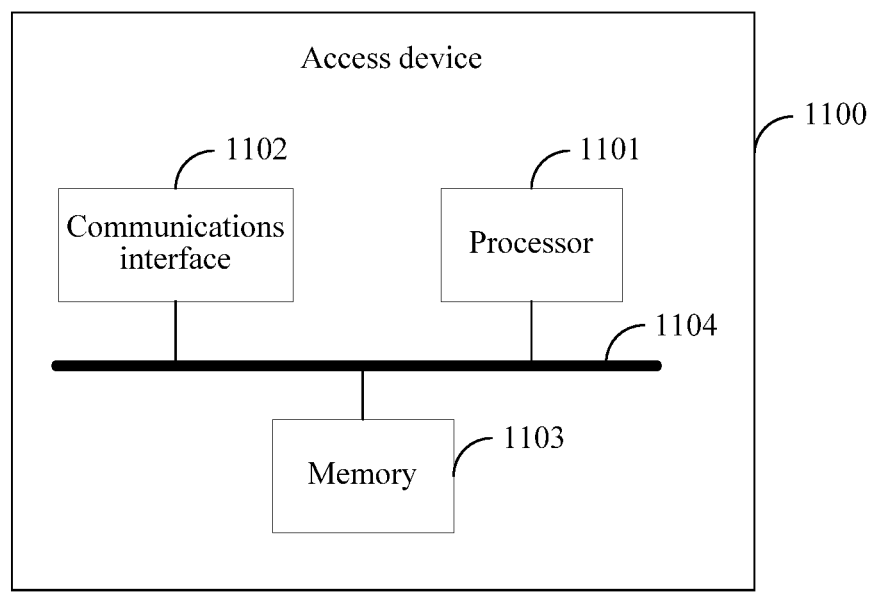
FIG. 11 is a schematic structural diagram of an access device according to an embodiment of the present disclosure.

When the processing module is a processor, the communications module is a communications interface, and the storage module is a memory, the access device in the embodiment of the present disclosure may be an access device 1100 shown in FIG. 11.

Referring to FIG. 11, the access device 1100 includes a processor 1101, a communications interface 1102, a memory 1103, and a bus 1104. The processor 1101, the communications interface 1102, and the memory 1103 are connected to each other by using the bus 1104. The bus 1104 may be classified into an address bus, a data bus, a control bus, and the like. For ease of illustration, only one bold line is shown in FIG. 11, but it does not mean that there is only one bus or one type of bus.

An embodiment of the present disclosure further provides a computer storage medium. The computer storage medium stores computer program code, and the computer program code includes an instruction. When the processor 1101 of the access device 1100 executes the instruction, the access device 1100 executes the related method steps shown in any one of FIG. 3, FIG. 4, FIG. 5, FIG. 6, or FIG. 7, to interact with a terminal and a management server to implement the terminal's authorization and authentication.

It should be noted that, for detailed descriptions of functional units or modules in the access device provided by the embodiment of the present disclosure, and technical effects achieved after related method steps in any one of FIG. 3, FIG. 4, FIG. 5, FIG. 6, or FIG. 7 are performed by the functional units or modules, refer to related descriptions in the method embodiments of the present disclosure. Details are not described herein again.

Figure 12:
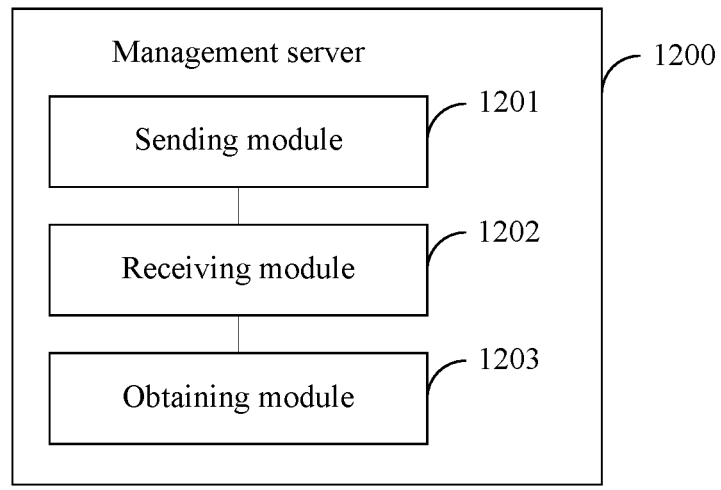
FIG. 12 is another schematic structural diagram of a management server according to an embodiment of the present disclosure.

FIG. 12 is a possible schematic structural diagram of a management server in the foregoing embodiments. As shown in FIG. 12, the management server 1200 includes a sending module 1201, a receiving module 1202, and an obtaining module 1203.

The sending module 1201 is configured to send a message or data to an access device or a terminal. For example, the sending module 1201 may be configured to send a JavaScript tag to the access device. For example, the sending module 1201 is configured to support the management server in performing S402 in FIG. 4, FIG. 5, and FIG. 7, and S701 in FIG. 7, and/or is used in other processes of the technology described herein.

The receiving module 1202 is configured to: after the sending module 1201 sends the JavaScript tag to the access device, receive an authentication address request sent by an unauthorized terminal. For example, the receiving module 1202 is configured to support the management server in performing S309 in FIG. 4, and S309*b* in FIG. 5 and FIG. 7, and/or is used in other processes of the technology described herein.

The obtaining module 1203 is configured to: after the receiving module 1202 receives the authentication address request sent by the unauthorized terminal, obtain, based on an address of the management server that is included in the JavaScript tag, an address of a least loaded portal server in at least two portal servers managed by the management server. For example, the obtaining module 1203 is configured to support the management server in performing S402 in FIG. 4, FIG. 5, and FIG. 7, and/or is used in other processes of the technology described herein.

Further, the management server 1200 may include a storage module configured to store program code and data of the management server 1200.

If an integrated module is used, the sending module 1201 and the receiving module 1202 may be integrated into one communications module for implementation. The communications module may be a communications interface, a transceiver circuit, a transceiver, or the like. The obtaining module 1203 may be integrated into one processing module for implementation. The processing module may be a processor or a controller, such as a CPU, a general purpose processor, a DSP, an ASIC, an FPGA or another programmable logic device, a transistor logic device, a hardware component, or any combination thereof. The processing module may implement or execute various illustrative logical blocks, modules, and circuits described with reference to the content disclosed in the present disclosure. The processing module may also be a combination for implementing computing functions, such as a combination of one or more microprocessors, a combination of a DSP and a microprocessor, or the like. The storage module may be a memory.

Figure 13:
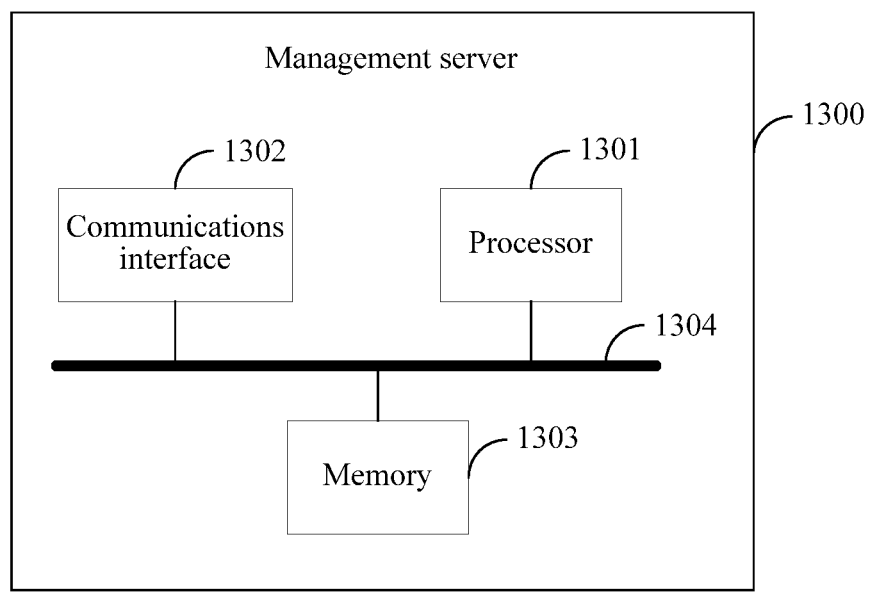
FIG. 13 is another schematic structural diagram of a management server according to an embodiment of the present disclosure.

When the processing module is a processor, the communications module is a communications interface, and the storage module is a memory, the management server in the embodiment of the present disclosure may be a management server 1300 shown in FIG. 13.

Referring to FIG. 13, the management server 1300 includes a processor 1301, a communications interface 1302, a memory 1303, and a bus 1304. The processor 1301, the communications interface 1302, and the memory 1303 are connected to each other by using the bus 1304. The bus 1304 may be classified into an address bus, a data bus, a control bus, and the like. For ease of illustration, only one bold line is shown in FIG. 13, but it does not mean that there is only one bus or one type of bus.

An embodiment of the present disclosure further provides a computer storage medium. The computer storage medium stores computer program code, and the computer program code includes an instruction. When the processor 1301 of the management server 1300 executes the instruction, the management server 1300 performs the related method steps shown in any one of FIG. 3, FIG. 4, FIG. 5, FIG. 6, or FIG. 7, to interact with a terminal and an access device to implement the terminal's authorization and authentication.

For detailed descriptions of functional units or modules in the management server provided by the embodiment of the present disclosure, and technical effects achieved after related method steps in any one of FIG. 3, FIG. 4, FIG. 5, FIG. 6, or FIG. 7 are performed by the functional units or modules, refer to related descriptions in the method embodiments of the present disclosure. Details are not described herein again.

Method or algorithm steps described in combination with the content disclosed in the present disclosure may be implemented by hardware, or may be implemented by a processor by executing a software instruction. The software instruction may include a corresponding software module. The software module may be stored in a random-access memory (RAM), a flash memory, a read-only memory (ROM), an erasable programmable ROM (EPROM), an electrically EPROM (EEPROM), a register, a hard disk, a mobile hard disk, a compact disc ROM (CD-ROM), or any other form of storage medium well-known in the art. For example, a storage medium is coupled to a processor, so that the processor can read information from the storage medium and write information into the storage medium. Certainly, the storage medium may be a component of the processor. Certainly, the processor and the storage medium may exist in the core network interface device as discrete components.

A person skilled in the art should be aware that in the foregoing one or more examples, functions described in the present disclosure may be implemented by hardware, software, firmware, or any combination thereof. When the present disclosure is implemented by software, the foregoing functions may be stored in a computer-readable medium or transmitted as one or more instructions or code in the computer-readable medium. The computer-readable medium includes a computer storage medium and a communications medium, where the communications medium includes any medium that enables a computer program to be transmitted from one place to another. The storage medium may be any available medium accessible to a general purpose or dedicated computer.

The objectives, technical solutions, and benefits of the present disclosure are further described in detail in the foregoing specific implementations. It should be understood that the foregoing descriptions are merely specific implementations of the present disclosure, but are not intended to limit the protection scope of the present disclosure. Any modification, equivalent replacement, or improvement made based on the technical solutions of the present disclosure shall fall within the protection scope of the present disclosure.

What is claimed is:

1. A terminal authentication method implemented by a terminal, the terminal authentication method comprising:
   initiating, using an application in the terminal, a Hypertext Transfer Protocol (HTTP) traffic request;
   sending, to an access device, the HTTP traffic request;
   receiving, from the access device and in response to the terminal being an unauthorized terminal, an HTTP traffic response comprising a JavaScript tag, wherein the JavaScript tag comprises a second address of a management server;
   obtaining, from the management server and using the application, a first address of a portal server based on the second address; and
   performing authorization and authentication on the terminal based on the first address.

2. The terminal authentication method of claim 1, further comprising executing, using the application, an Asynchronous JavaScript and Extensible Markup Language (Ajax) script based on the second address to obtain, from the management server, the first address.

3. The terminal authentication method of claim 2, wherein the JavaScript tag further comprises a third address of a default portal server, and wherein the method further comprises further performing the authorization and the authentication further based on the third address when the application does not support Ajax.

4. The terminal authentication method of claim 2, wherein the portal server is a least-loaded portal server in a group of portal servers managed by the management server.

5. The terminal authentication method of claim 1, further comprising:
   executing, using the application, a JavaScript script; and
   redirecting, to a terminal authentication page of the portal server based on the first address, the application to perform the authorization and the authentication.

6. The terminal authentication method of claim 5, further comprising:
   initiating, using the application, an HTTP authentication page request to the portal server; and
   further executing the JavaScript script to complete a Transmission Control Protocol (TCP) handshake and a Secure Sockets Layer (SSL) handshake with the portal server.

7. The method of claim 6, further comprising:
   receiving an HTTP authentication page response comprising a Uniform Resource Locator (URL) of an HTTP authentication page;
   parsing the URL;
   loading and displaying the HTTP authentication page based on the URL;
   receiving authentication information via input from a user on the HTTP authentication page; and
   sending the authentication information to the portal server for the authorization and the authentication.

8. The terminal authentication method of claim 1, wherein the HTTP traffic response comprises Hyper Text Markup Language (HTML) information, and wherein the HTML information is embedded with the JavaScript tag.

9. The terminal authentication method of claim 8, wherein the HTML information originates from the management server.

10. A terminal authentication method implemented by a terminal, the terminal authentication method comprising:
    initiating, using an application in the terminal, a Hypertext Transfer Protocol (HTTP) traffic request;
    sending, to an access device, the HTTP traffic request;
    receiving, from the access device and in response to the terminal being an unauthorized terminal, an HTTP traffic response comprising a JavaScript tag, wherein the JavaScript tag comprises a portal server list, and wherein the portal server list comprises an address of at least one portal server;
    obtaining, using the application, a first address of a first portal server from the portal server list; and performing authorization and authentication on the terminal based on the first address.

11. The terminal authentication method of claim 10, wherein the first portal server is a least-loaded portal server in the portal server list.

12. A terminal comprising:
a memory configured to store an application; and
a processor coupled to the memory and configured to:
   initiate, using the application, a Hypertext Transfer Protocol (HTTP) traffic request;
   send, to an access device, the HTTP traffic request;
   receive, from the access device and in response to the terminal being an unauthorized terminal, an HTTP traffic response comprising a JavaScript tag, wherein the JavaScript tag comprises a second address of a management server;
   obtain, from the management server and using the application, a first address of a portal server based on the second address; and
   perform authorization and authentication on the terminal based on the first address.

13. The terminal of claim 12, wherein the processor is further configured to execute, using the application, an Asynchronous JavaScript and Extensible Markup Language (Ajax) script based on the second address to obtain, from the management server, the first address.

14. The terminal of claim 13, wherein the JavaScript tag further comprises a third address of a default portal server, and wherein the processor is further configured to further perform the authorization and the authentication based on the third address when the application does not support Ajax.

15. The terminal of claim 13, wherein the portal server is a least-loaded portal server in a group of portal servers managed by the management server.

16. The terminal of claim 12, wherein the processor is further configured to:
   execute, using the application, a JavaScript script; and
   redirect, to a terminal authentication page of the portal server based on the first address, to perform the authorization and the authentication.

17. The terminal of claim 16, wherein the processor is further configured to:
   initiate, using the application, an HTTP authentication page request to the portal server; and
   further execute the JavaScript script to complete a Transmission Control Protocol (TCP) handshake and a Secure Sockets Layer (SSL) handshake with the portal server.

18. The terminal of claim 17, wherein the processor is further configured to:
   receive an HTTP authentication page response comprising a Uniform Resource Locator (URL) of an HTTP authentication page;
   parse the URL;
   load and displaying the HTTP authentication page based on the URL;
   receive authentication information via input from a user on the HTTP authentication page; and
   send the authentication information to the portal server for the authorization and the authentication.

19. A terminal comprising:
a memory configured to store an application; and
a processor coupled to the memory and configured to:
   initiate, using the application, a Hypertext Transfer Protocol (HTTP) traffic request;
   send, to an access device, the HTTP traffic request;
   receive, from the access device and in response to the terminal being an unauthorized terminal, an HTTP traffic response comprising a JavaScript tag, wherein the JavaScript tag comprises portal server list, and wherein the portal server list comprises an address of at least one portal server;
   obtain, using the application, a first address of a first portal server from the portal server list; and
   perform authorization and authentication on the terminal based on the first address.

20. The terminal of claim 19, wherein the first portal server is a least-loaded portal server in the portal server list.

21. An access device comprising:
a memory; and
a processor coupled to the memory and configured to:
   receive, from a terminal, a Hypertext Transfer Protocol (HTTP) traffic request;
   make a determination that the terminal is an unauthorized terminal; and
   send, to the terminal and in response to the determination, an HTTP traffic response comprising a JavaScript tag to prompt the terminal to obtain a first address of a first portal server from a management server and to perform authorization and authentication based on the first address, wherein the JavaScript tag comprises a second address of the management server.

22. The access device of claim 21, wherein the processor is further configured to:
   send, to the management server and according to the second address, a Hyper Text Markup Language (HTML) information request; and
   receive, from the management server, HTML information comprising the JavaScript tag.

23. The access device of claim 21, wherein the JavaScript tag further comprises a third address of a default portal server.

24. The access device of claim 21, wherein the first portal server is a least-loaded portal server in a group of portal servers managed by the management server.

25. An access device comprising:
a memory; and
a processor coupled to the memory and configured to:
   receive, from a terminal, a Hypertext Transfer Protocol (HTTP) traffic request;
   make a determination that the terminal is an unauthorized terminal; and
   send, to the terminal and in response to the determination, an HTTP traffic response comprising a JavaScript tag to prompt the terminal to obtain a first address of a first portal server and to perform authorization and authentication based on the first address, wherein the JavaScript tag comprises a portal server list, wherein the portal server list comprises an address of at least one portal server, and wherein the portal server list comprises the first address of the first portal server.

26. The access device of claim 25, wherein the first portal server is a least-loaded portal server in the portal server list.

* * * * *